DATA PUNCHING MACHINE

Original Filed Dec. 29, 1969 3 Sheets-Sheet 1

DATA PUNCHING MACHINE

Original Filed Dec. 29, 1969 3 Sheets-Sheet 2

DATA PUNCHING MACHINE

Original Filed Dec. 29, 1969 3 Sheets-Sheet 3

United States Patent Office

Re. 27,941
Reissued Mar. 19, 1974

27,941

DATA PUNCHING MACHINE

John H. Edwards, Attleboro, Mass., assignor to The Entwistle Co.

Original No. 3,633,817, dated Jan. 11, 1972, Ser. No. 888,237, Dec. 29, 1969. Application for reissue July 12, 1972, Ser. No. 270,940

Int. Cl. G06k *1/08*

U.S. Cl. 234—77 3 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a machine which will punch a form in a particular code pattern under the control of a template. It will also imprint letters that are raised from the surface of the template. This is accomplished by providing two portions which are hinged together and which have a template holding plate therebetween. One of the portions carries a plurality of individually movable plungers that are adapted to enter perforations provided in the template held on the template support and pass through the template and into a form held by the other portion when the two portions are brought together by an operating handle. Means are provided on the template support plate to properly orient the template relative to the two portions and the punches are operated by the handle being coupled thereto through a linkage arrangement. Additionally coupled to the handle is a printing pressure roller which passes across the raised lettering that is provided on the template so that an imprinting action will occur simultaneous with the punching of the form.

BACKGROUND OF THE INVENTION

In the Hart Pat. 2,803,187, the Hopp Pat. 2,909,221 and the Minardi Pat. 2,988,989 a data printing and punching machine has been disclosed which the instant invention is an improvement thereover. In these prior art devices, as disclosed in the above-mentioned patents, the template and the form which is to be punched pass into a slot or chute and are held by plates into proper position. The punches thereupon operate by either passing through or being restricted by the template and insert the proper information on the form. This type of device has certain operating disadvantages principally in the fact that the operator cannot at all times look at the form and the template to see that they are being properly placed within the machine. Accordingly, the present invention obviates operator difficulty and opens up the area into which the form and the template are placed by providing a two-part or two-portion machine with the template and form located between these two portions and suitably held in operating position.

SUMMARY OF THE INVENTION

The punching machine of this invention has particular application at transactions which involve the use of credit cards and upon which it is desired to machine read the identity of the customer by the use of holes punched in a predetermined code fashion on invoice forms. The machine briefly comprises a base and top portion which are pivotally related to each other and which have between them a plate which supports the credit card or template, which is provided with holes therein that identify the user or holder of the credit card in the standard machine readable form. One of the portions of the machine carries a plurality of punches which are engageable with the credit card or template and those punches which register with the code holes in the template pass through the template and into punching engagement with the invoice form which is held on one of the portions of the machine, thereby punching into the invoice a plurality of code holes corresponding in number and location to the code holes in the template or credit card. An important feature of this machine is the provision in the base portion of pins or the like which will hold the invoice form in proper relationship to the mechanism and further the pins of different cross sectional shape which hold template on the [hinge] *hinged* template *support* plate in proper relationship together with master alignment means for the three parts insuring that the punches are in proper alignment with the template. This taken with the handle, which pivots on the top portion and which, through a linkage operates the punches and actuates a pressure roller to transfer raised printing on the template to the form, and interlock means for the handle, which may only be operated when the top and bottom portions are juxtaposed and locked together, provides simplicity of operation.

DESCRIPTION OF THE PREFERRED EMBODIMENT

Figure 1:
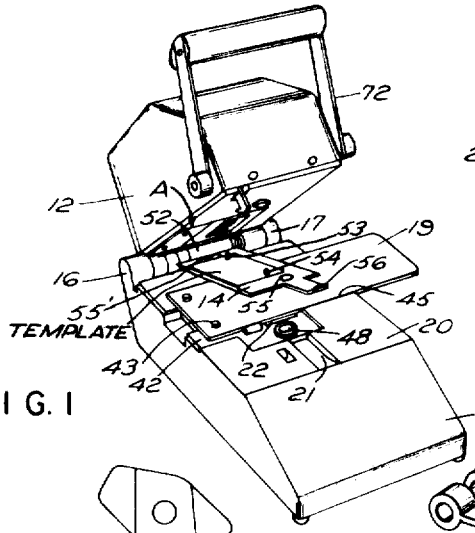
FIG. 1 is a perspective view of the machine of this invention in open position.

The machine includes a base portion 10, a top portion 12 and a template [holding] *support* plate 14. The base, top and template support plate are pivotally related together on a hinge post 15 which is held in position by a pair of ears 16 and 17 that extend from the base portion 10 and top portion 12.

Figure 2:
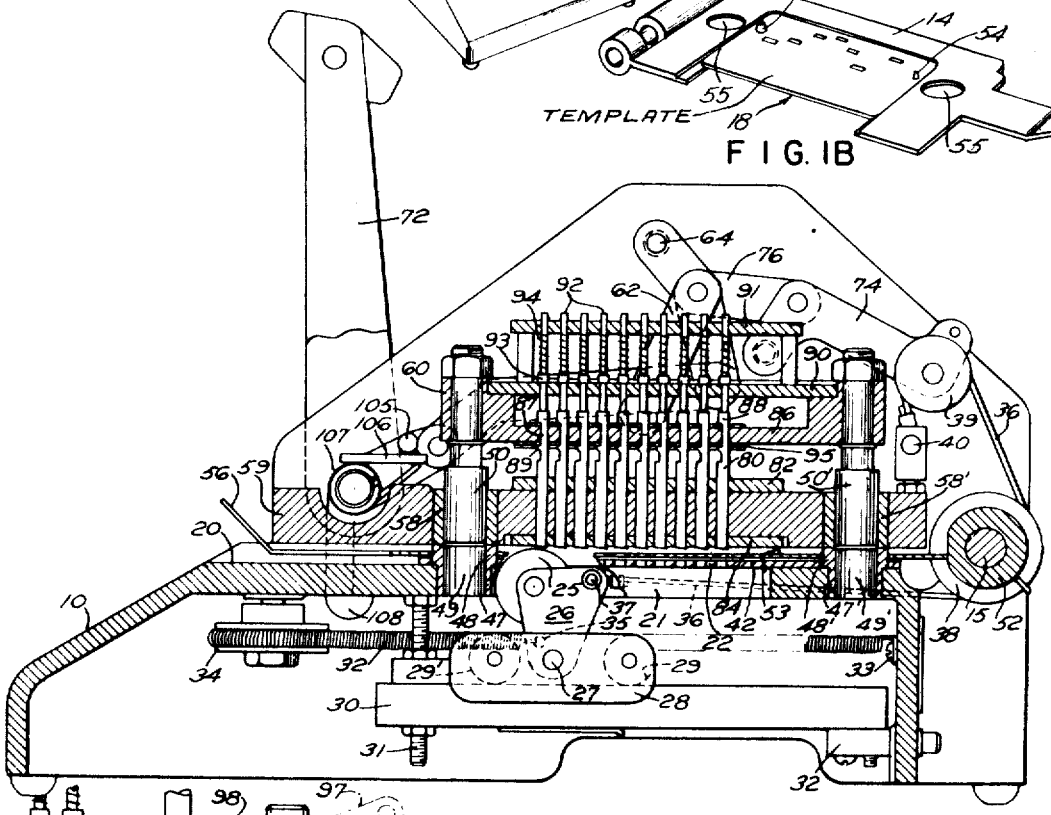
FIG. 2 is a central longitudinal sectional view of the machine in closed position with certain parts broken away.

The base portion 10 is provided with an upper deck face 20 and in an aperture 21 in this deck face there is fastened a die plate 22 [via] *in* support plate 42 which has a plurality of openings therein for the reception of punches and to one side of the plurality of openings, an elongated opening 24 is provided through which a pressure roller 25 may pass. The pressure roller 25 is mounted between a pair of plates 26 which in turn are pivoted as at 27 to a carriage designated 28. The carriage 28 has a pair of wheels 29, 29' which ride on a rail 30 which rail 30 is secured in position within the the base portion 10 by an adjusting stud 31 and a bracket 32. The pressure roller and its carriage are in the position as shown in FIG. 2 and are retained there by a spring 32 which is preferably anchored as at 33 to a portion of the base and thence passes about a sheave 34 to be attached to the pivoting plate 26 as at 35. Means for moving the pressure roller are provided by a cable 36, which is attached to the support plate 26 as at 37 and then extends about a sheave 38 to an actuating pulley 39 and thence to an anchor point as at 40.

Figure 1A:
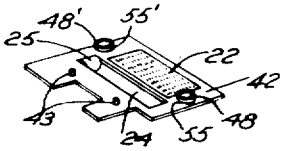
FIG. 1A is a perspective view of the lower plate upon which the invoice form is received.

The upper deck face of the base portion is provided with a plate 42 (see FIG. 1A) which has protruding therefrom a pair of pins 43 which serve to enter corresponding holes provided in the invoice form *or formset 19*. The invoice form is located on pins 43 and as the machine is closed is finally pressed into location due to pressure from recessed plate A mounted on lower deck face of upper portion 12 (see FIG. 1). Also the top deck of the base portion has a recess as at 45 and this together with the pins on plate 42 properly orient the invoice form relative to the die plate 22. The plate 42 is also provided with a pair of bushings 47, 47' which have raised shoulders 48, 48' and these bushings 47, 47' have openings therein 49, 49' for the reception of registration posts 50, 50' carried by the top portion.

Figure 1B:
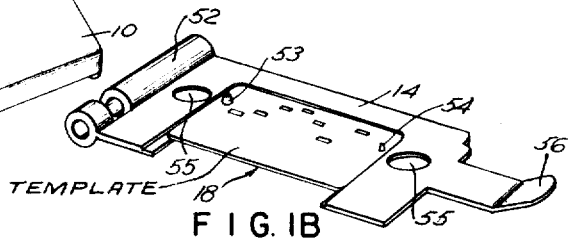
*FIG. 1B is a perspective view of the template support plate;*
Figure 3:
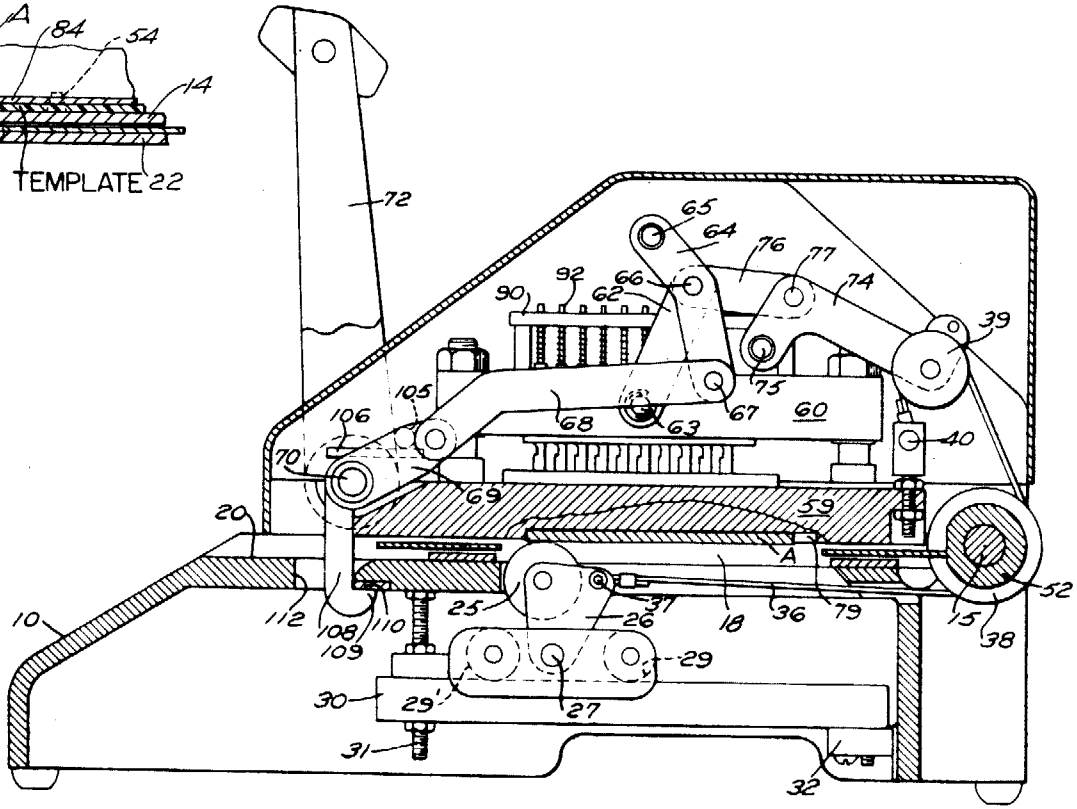
FIG. 3 is a longitudinal sectional view taken to one side of the center line showing the pressure roller with certain parts omitted for clarity.
Figure 1C:
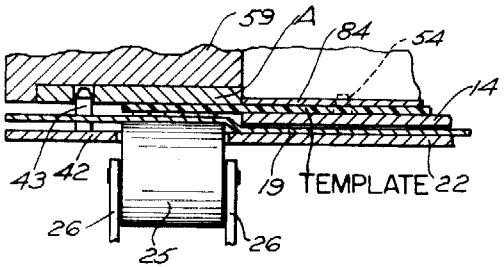
*FIG. 1C is a diagramatic fragmentary sectional view showing the relationship of the pressure roller, invoice form and template support plate;*

The template support plate 14 has an enlarged boss 52 which encircles the hinge post 15 for pivoting movement and protruding from the top surface of the plate are a pair of pins 53, 54 which are preferably provided with different cross-sectional shapes and which are adapted to engage apertures in the template which is received on the template support plate. The template support plate also has a pair of holes therein which are designated 55, 55' (see FIG. 1) and which are received over the enlarged bosses 48, 48' that protrude from the plate 42. The forward end of the template support plate is provided with a lifting finger as at [46] *56* which is bent so as to extend above the upper deck face of the lower or base portion 10. The central section of the template support plate is also apertured so that the punches may pass therethrough. *Additionally an elongated aperture or slot 18 (as seen in FIGS. 1B, 3) is formed in the template support plate. This elongated aperture is positioned to align with elongated aperture 24 in plate 42 so that pressure roller 25 may force a formset 19 therethrough against the embossed portion of the template or credit card, which pressure is resisted by plate A. (See FIG. 1C.)*

*The alignment of the top and base portions and the template support plate is by means comprising the hinging arrangement. A common hinge pin 15 has widely spaced bearing 16, 17 in the base portion, the template support plate 14 has spaced substantial bearings 52 on this pin while the top portion has spaced bearings interleaved with these bearings.*

The aligning posts 50, 50' are mounted in bushing 58, 58' that are received in the lower deck face of the top portion designated 59. Upon the top end of the aligning posts 50, 50' there is mounted a carriage generally designated 60 and this carriage carries the plurality of punches which are used for the hole punching operation in the invoice form. The punch assembly carriage 60 together with the aligning posts 50, 50' are located in the top portion (see FIG. 3). *A* [by a] pair of [bell crank] links [64] *62* [which] are attached to each side of the punch assembly carriage 60 as at 63 and [to the side walls of the top section as at 65. A pair of link arms 62] are pivoted substantially centrally to [the] *a pair of* bell crank [link] *links* 64 as at 66. *The bell crank link 64 is attached to the side wall of the top section as at 65* and has its other free end, as at 67, connected to an operating arm 68 that is pivoted to a handle link 69. The handle link 69 is rigidly attached to the handle shaft 70 to which the handle 72 proper is also pinned. Thus upon rotation of the handle 72 in a counter clockwise direction as viewed in the drawing it will be seen, particularly by referring to FIGS. 3 and 4, that the bell crank links will assume a position which will extend the punch assemby carriage 60 downwardly as well as the aligning posts 50, 50' which are received within the bushing 47, 47' at 49, 49', thus *the pins and posts insure* [insuring] proper alignment of the top portion and base portion *and the template support plate*. It should be appreciated that the linkage parts just described above are repeated on both sides of the top portion of the machine or on both sides of the punch assembly carriage 60 although only one side is shown on the drawings for simplicity of illustration.

Figure 4:
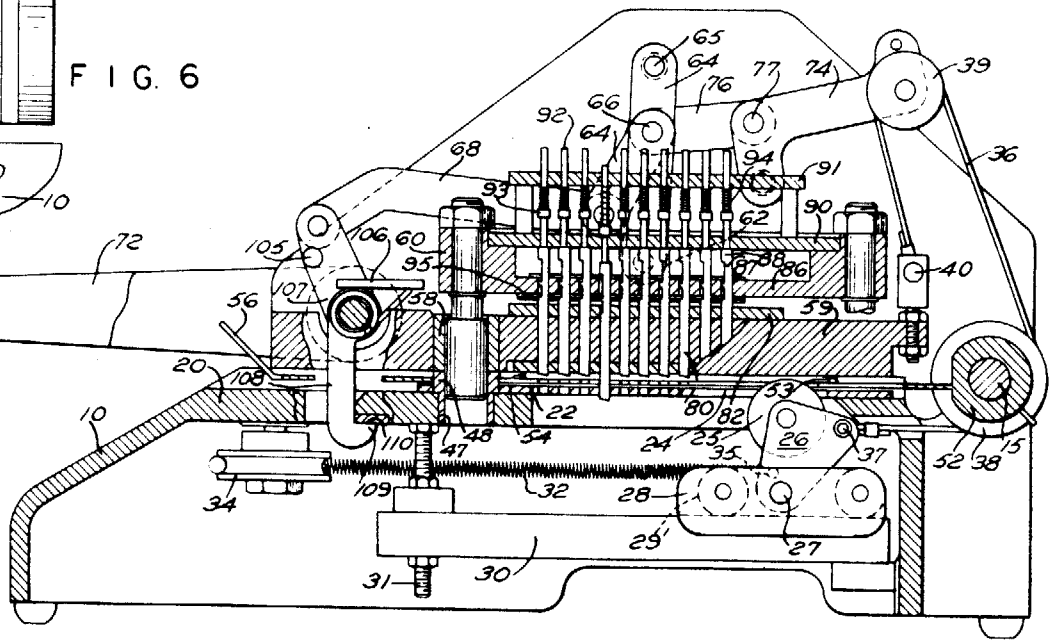
FIG. 4 is a central longitudinal view section showing the handle in completely depressed and in completed operational position with certain parts broken away.

The linkage assembly just described also serves to move the pressure roller 25 from its rest position as shown in FIG. 3 to the position as is shown in FIG. 4. To effect this motion, a bell crank 74 is pivoted as at 75 to the top portion of the machine and the free end of this bell crank carries the actuating pulley 39 about which the cable 36 extends. By utilizing an interconnecting link 76 from pivot point 66 to pivot point 77 of the bell crank 74, movement of the bell crank 74 may be had. To this end as the handle 72 is rotated from the position in FIG. 3 to that of FIG. 4, the pulley 39 will effectively be raised thus pulling the cable 36 and moving the roller 25 across the letter imprint area of the template.

Initial tensioning of cable 36 pivots roller 25 on side plates 26 as at 27 to bear pressure through the invoice form and embossed template on pressure plate A. This pivoting compensates for various invoice thicknesses and height of embossed digits on templates. Further tension draws roller 25 across embossed area of template until end of pressure plate A is reached. The void 79 behind the template (see FIG. 3) then allows roller 25 and plate 26 assembly to trip over the central highest position at the end of the stroke (see FIG. 4). As the handle is raised, tension is released from the cable 36 and return spring 32 pulls carriage back to rest position at a controlled rate, thereby reducing noise to a minimum. When the machine is opened, spring 32 resets the roller plate assembly in the behind center position for next cycle (see FIG. 2). It will be seen that since the roller is constantly urged against the invoice form and presses the same against the template that it is self-compensating for various invoice form thicknesses and template embossing heights. The roller 25 is raised by the initial tension on cable 36 which makes it self-activating and when it enters the void 79 becomes self-deactivating, the spring 32 making the roller self-resetting. Further since the roller has gone behind center position by entering void 79, it will remain in that position during the return movement so that a double impression cannot be had.

Figure 6:
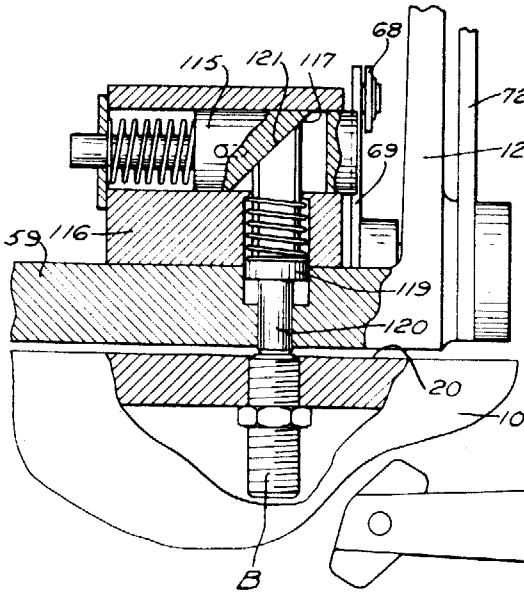
FIG. 6 is an enlarged fragmentary sectional view of the handle latch.

Directing attention to FIGS. 3 and 6, it should first be noted that in connection with the operation of the handle 72 and the linkage associated therewith that a delatching mechanism is provided in connection with the operation of the handle 72. To this end, a pin 105 extends from the link arm 69 and is adapted to slide over and depress an arm 106 that extends from the rotatable bushing portion 107 of the latch 108. The latch 108 is provided with a front nose 109 having a camming surface thereon and a laterally extending surface as at 110 for engagement on the underside of the deck surface 20. This latch 108 is adapted to pass through an aperture 112 in the deck surface 20 and by virtue of the pressure exerted by the pin 105 on the arm 106, the latch will normally be rotated in a clockwise direction. However, once the device is closed and the handle is rotated to the left as viewed in the drawing, this pressure will be released and the latch 108 will rotate due to spring biasing (not shown) to engage under the undersurface of the deck 20. It will be appreciated that this will insure that the device will become de-latched every time the handle is returned to its upright position. It will be further appreciated that the cage maintains the parts together in a normal punch to die relationship which is resisted in the other direction by a combination of spring pressure and printing pressure exerted by the roller 25.

Further means are provided in connection with the device to prevent rotation of the handle 72 until the top and bottom portions have been brought together and locked. To this end, a spring plunger 115 is received within a block 116 which is mounted within the top portion. The plunger 116 has a cam face 117 and a protruding portion extends out of the block that passes above the link arm 69 in a position to prevent counter-clockwise rotation thereof as viewed in the drawing. When, however, the top portion 12 is brought down against the bottom portion 10, a plunger 119, which has a protruding portion as at 120, will strike adjusting screw B in the top deck surface of the bottom portion. Since the plunger 119 has a cam face 121, the movement upwardly will engage the cam face 117 and move the plunger 115 to the left. This retracts the protruding portion so that the link arm 69 may be permitted to move and complete the operation of the machine. Screw B is adjusted such that handle rotation cannot occur until latch 108 is fully engaged at 110.

Turning now to the hole punching operation where holes are punched into the invoice form and registration with code holes in the template, it will be seen that the punch assembly is basically mounted on the carriage 60 and there are provided a plurality of punches that are slidably supported in the registering holes in upper and lower plate 82 and 84 in the top portion and in apertures in the lower deck 86 of the punch assembly carriage 60. Each punch is provided with a cutout at 87 along one side edge thereof and at the top of each cutout is a shoulder 88, while adjacent the lower end of the cutout 87 is a projection 89. The top edge of the projection is normal to the longitudinal extent of the punch while the front edge is disposed at an angle to form a cam face. At the top of the carriage 60 are a pair of plates 90 and 91 and slidably supported in these plates are a plurality of pins 92, one for each punch 80, and in abutment therewith. Each pin 92 has a shoulder 93 thereon and a compression spring 94 mounted with one end in abutment with the shoulder and the opposite end in abutment with the end plate 91. The action of the spring 94 is to urge the pins 92 downwardly as viewed in the drawing to maintain the punches 80 in their downward position.

Figure 5:
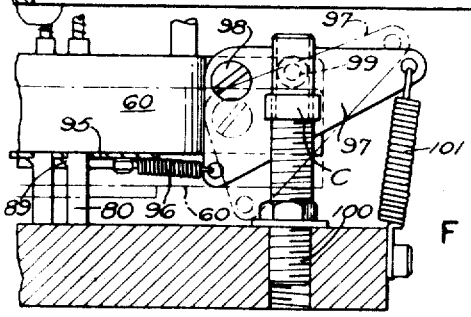
FIG. 5 is an enlarged fragmentary sectional view of the punch locking plate operating mechanism.

As seen in the drawing and more particularly in FIG. 5, a cam plate 95 is slidably fastened for movement transverse of the rows of punches 80 as viewed in the drawing at the lower edge of the punch assembly carriage 60. A spring 96 is secured to one end of the plate 95 and at the opposite end to an arm 97 which is pivoted as at 98 to the carriage. Arm 97 carries an actuating pin 99 which is adapted to engage a cam C on a stud 100 that protrudes from the base portion 59 of the top portion. The arm 97 is normally urged in non-operative position by a spring 101. When the punch carriage 60 is caused to reciprocate downwardly, the arm 97 will be moved in a counterclockwise position to that as shown in broken lines and this permits the spring 96 to pull the plate 95 to the right as viewed in the drawing. When the carriage 60 moves upwardly, the arm 97 will return to the position as shown in solid lines in the drawing. The openings in the plate 95 are normally of a size to permit the punches 80 to move therethrough, but when the plate 95 is moved rightwardly under the influence of the spring 96 and the arm 97, plate 95 becomes a stop member relative to the projections 89 on all selected punches; that is, those which register with the code holes in the template and are therefore permitted to remain in their forward positions. The imperforate parts of the template have pushed the other or unwanted punches rearwardly a sufficient distance so that their projections 89 are upwardly of the plate 95. It will be apparent that continued downward movement of the carriage 60 toward the punching position brings the forwardly projecting punches into engagement with the form or invoice which is to be punched through the code holes in the template card and corresponding holes are punched into the form, and when this is accomplished, the plate 22 with its openings that correspond to the punches functions the die plate.

At the conclusion of the punching operation the linkage assembly will raise the punch assembly carriage 60 and since plate 95 will move to the left as viewed in the drawings, all punches are normalized into the position as shown in FIG. 2 in the drawings.

In summary, it will be seen that to operate the machine the person utilizing the same will first place the invoice form on the upper deck face of the base portion aligning the same with the aligning pins 43 and the recess 45. The template support plate 14 may then be lowered into position and the credit card template placed thereon with the raised lettering facing downward so that the pins 53, 54 properly extend therethrough. The top portion 12 is then brought downwardly by the use of the handle 72 and latched. After the two portions are suitably latched together, the handle linkage will be released by the locking pin 115 and the handle will be rotated in a down direction. Punches will [have been previously selected before the handle is rotated] *be selected during initial rotation of the handle* and those that extend through the template will be passed on down to the invoice form punching the same in proper machine readable format. Also as the handle is rotated downwardly, the imprinting roller 23 will move across the apertured portion and make an impression on the invoice form which is pressed against the raised lettering on the template. When the handle is released or moved upwardly the pressure roller will return under spring urgence and the punch carriage will be raised. Then when the top portion 12 is elevated the invoice form and the template may again be removed.

I claim:

[1. A machine for punching a form through a template having code holes therein comprising a base portion having an upper deck face, a top portion having a lower deck face pivotally related to the base portion, a template support plate having an elongated aperture pivotally related to the base and positioned to lie between the base and top portions, a punch assembly carried by [one] portion and a stationary die carried by the other portion, means adjacent the stationary die to hold a form in position, alignment means orienting a template on the template support plate, bushing means protruding from the upper deck face of the base portion, the template support plate received about the bushings, and registration post means on the top portion cooperating with the bushings to insure reregistration of the punch assembly, the template and stationary die.]

[2. A machine as in claim 1 wherein the alignment means for the template comprises a pair of pins and said template has a pair of apertures, said pins protruding into said apertures.]

[3. A machine as in claim 2 wherein said pins have different cross section to ensure placing of a template correctly on the support plate.]

4. A machine for punching a form through a template having code holes therein comprising a base portion having an upper deck face, a top portion having a lower deck face pivotally related to the base portion, a template support plate pivotally related to the base and positioned to lie between the base and top portions, *said pivotal relations being by means of a common pivot,* a punch assembly carried by one portion and a stationary die carried by the other portion, means adjacent the stationary die to hold a form in position, [alignment means orienting a template on the template support plate and registration post means on each of said portions cooperating together and with the template support plate to ensure registration of the punch assembly, the template and stationary die] *alignment means orienting a template on the template support plate, second alignment means orienting said punch assembly and template support plate with the stationary die,* one *of said portions* [portion] carrying a handle pivotally mounted thereon, means for pressing a form against a portion of the template, said handle having mechanically coupled thereto the pressing means whereby pivoting of said handle will actuate the pressing means, a spring-loaded latch coupled to said handle, said latch operable upon said portions being brought together to release said handle for pivoting movement.

5. A machine as in claim 4 wherein a catch is attached to one *of said portions* [portion] to hold the portions together and wherein said handle in the nonoperative position releases the catch.

*6. A machine as in claim 4 wherein the alignment means orienting the template on the template support plate comprises a pair of pins and said template has a pair of apertures, said pins protruding into said apertures, said pins have different cross sections to ensure placing of a template correctly on the support plate.*

References Cited

The following references, cited by the Examiner, are of record in the patented file of this patent or the original patent.

UNITED STATES PATENTS

| | | | |
|---|---|---|---|
| 3,059,570 | 10/1962 | Wagner | 234—45 X |
| 3,137,441 | 6/1964 | Forsyth et al. | 234—78 |
| 3,656,687 | 4/1972 | Romney | 234—78 X |
| 3,170,390 | 2/1965 | Wagner | 234—35 X |
| 3,007,630 | 11/1961 | Jones | 234—77 X |
| 3,008,633 | 11/1961 | Pennington | 234—77 |
| 2,803,187 | 8/1957 | Hart et al. | 234—76 X |

JAMES M. MEISTER, Primary Examiner

U.S. Cl. X.R.

234—35